United States Patent
Grimm et al.

(10) Patent No.: US 8,709,207 B2
(45) Date of Patent: Apr. 29, 2014

(54) METHOD OF USING ALDEHYDE-FUNCTIONALIZED POLYMERS TO INCREASE PAPERMACHINE PERFORMANCE AND ENHANCE SIZING

(75) Inventors: Mark Grimm, Stanley, NC (US); Michael R. St. John, Chicago, IL (US)

(73) Assignee: Nalco Company, Naperville, IL (US)

( * ) Notice: Subject to any disclaimer, the term of this patent is extended or adjusted under 35 U.S.C. 154(b) by 1 day.

(21) Appl. No.: 12/938,017

(22) Filed: Nov. 2, 2010

(65) Prior Publication Data

US 2012/0103547 A1    May 3, 2012

(51) Int. Cl.
*D21H 11/00*    (2006.01)

(52) U.S. Cl.
USPC .................................................. 162/164.1

(58) Field of Classification Search
None
See application file for complete search history.

(56) References Cited

U.S. PATENT DOCUMENTS

| | | | |
|---|---|---|---|
| 2,982,749 A | | 5/1961 | Friedrich et al. |
| 3,284,393 A | | 11/1966 | Vanderhoff et al. |
| 3,556,932 A | * | 1/1971 | Coscia et al. ............... 162/166 |
| 3,734,873 A | | 5/1973 | Anderson et al. |
| 4,603,176 A | | 7/1986 | Bjorkquist et al. |
| 4,605,702 A | | 8/1986 | Guerro et al. |
| 4,657,946 A | | 4/1987 | Rende et al. |
| 4,919,821 A | | 4/1990 | Fong et al. |
| 4,929,655 A | | 5/1990 | Takeda et al. |
| 5,006,590 A | | 4/1991 | Takeda et al. |
| 5,147,908 A | | 9/1992 | Floyd |
| 5,571,380 A | | 11/1996 | Fallon et al. |
| 5,597,858 A | | 1/1997 | Ramesh et al. |
| 5,597,859 A | | 1/1997 | Hurlock et al. |
| 5,605,970 A | | 2/1997 | Selvarajan |
| 5,654,198 A | * | 8/1997 | Carrier et al. ..................... 436/6 |
| 5,674,362 A | * | 10/1997 | Underwood et al. ...... 162/164.3 |
| 5,837,776 A | | 11/1998 | Selvarajan et al. |
| 5,985,992 A | | 11/1999 | Chen |
| 6,013,708 A | | 1/2000 | Mallon et al. |
| 6,077,394 A | | 6/2000 | Spence et al. |
| 6,083,348 A | | 7/2000 | Auhorn et al. |
| 6,238,521 B1 | | 5/2001 | Shing et al. |
| 6,315,866 B1 | * | 11/2001 | Sanchez ..................... 162/168.2 |
| 6,426,383 B1 | | 7/2002 | Fong et al. |
| 6,472,487 B2 | | 10/2002 | Schroeder et al. |
| 6,491,790 B1 | | 12/2002 | Proverb et al. |
| 6,610,209 B1 | | 8/2003 | Sommese et al. |
| 6,743,335 B2 | | 6/2004 | Proverb et al. |
| 7,034,087 B2 | | 4/2006 | Hagiopol et al. |
| 7,119,148 B2 | | 10/2006 | Hagiopol et al. |
| 7,455,751 B2 | | 11/2008 | Ward et al. |
| 7,488,403 B2 | | 2/2009 | Hagiopol et al. |
| 7,550,060 B2 | | 6/2009 | Jacobson et al. |
| 7,641,766 B2 | | 1/2010 | St. John et al. |
| 7,938,934 B2 | | 5/2011 | Todorovic et al. |
| 2006/0142535 A1 | | 6/2006 | Cyr et al. |
| 2008/0277084 A1 | | 11/2008 | Denowski et al. |
| 2008/0308242 A1 | | 12/2008 | Lu |
| 2009/0165978 A1 | | 7/2009 | Hagiopol et al. |
| 2011/0146925 A1 | | 6/2011 | Bode et al. |

FOREIGN PATENT DOCUMENTS

| | | |
|---|---|---|
| EP | 0151994 A2 | 8/1985 |
| EP | 183466 B1 | 8/1990 |
| EP | 183466 B2 | 8/1990 |
| EP | 657478 A2 | 6/1995 |
| EP | 657478 A3 | 6/1995 |
| EP | 630909 B1 | 10/1998 |

OTHER PUBLICATIONS

Hunkeler, et al., "Mechanism, Kinetics and Modeling of the Inverse-Microsuspension Homopolymerization of Acrylamide," Polymer, vol. 30, No. 1, 1989, pp. 127-142.
Hunkeler et al., "Mechanism, Kinetics and Modeling of Inverse-Microsuspension Polymerization: 2. Copolymerization of Acrylamide with Quaternary Ammonium Cationic Monomers," Polymer, vol. 32, No. 14, 1991, pp. 2626-2640.
Farley, C.E, "Glyoxalated Polyacrylamide Resin," Wet-Strength Resins and Their Application, TAPPI Press: Atlanta, GA, 1994, Chapter 3, pp. 45-61.
Parez product analysis (1999).
Hercobond product analysis (2002).
St. John, M.R., "Ondeo-Nalco Technical Exchange," dated Jun. 27, 2002 (5 pages).

* cited by examiner

*Primary Examiner* — Mark Halpern
(74) *Attorney, Agent, or Firm* — Edward O. Yonter

(57) ABSTRACT

Novel sizing mixtures to achieve improved sizing along with other benefits is disclosed and claimed. The invention is a composition comprising a sizing mixture having a stabilizing amount of one or more aldehyde-functionalized polymers and a sizing amount of a sizing composition. The invention is also a method of improving paper and paperboard production and enhancing sizing through adding an effective amount of the disclosed sizing mixture to the paper machine and a method of producing a medium having cellulosic fibers, wherein the method includes adding the disclosed sizing mixture to the medium at any point in a papermaking process.

21 Claims, 3 Drawing Sheets

US 8,709,207 B2

METHOD OF USING ALDEHYDE-FUNCTIONALIZED POLYMERS TO INCREASE PAPERMACHINE PERFORMANCE AND ENHANCE SIZING

TECHNICAL FIELD

This invention relates generally to a novel composition and method for improving paper and paperboard production. More specifically, the invention relates to a composition and method for using aldehyde-functionalized polymers as an emulsion stabilizer for sizing emulsions. The invention has particular relevance to the application of such polymers in sizing emulsion compositions as a replacement for traditional polymers.

BACKGROUND

Aldehyde-functionalized polymers based on polyacrylamide (and similar polymers as described herein), provide a multitude of benefits for paper and paperboard manufacturing that include temporary wet strength, dry strength, wet-web strength, Yankee dryer adhesives, and increased press dewatering. Such polymers are most commonly used in the paper and paperboard industry as additives to provide temporary wet strength and dry strength (see e.g., Coscia et al. U.S. Pat. No. 3,556,932, "Water-Soluble, Ionic, Glyoxalated, Vinylamide, Wet-Strength Resing and Paper Made Therewith"; Farley, C. E., "Glyoxalated Polyacrylamide Resin, pp. 45-61, in Wet-Strength Resins and Their Application, TAPPI Press: Atlanta, Ga., 1994). More recent innovations in these types of polymers are disclosed in, for example, U.S. Pat. No. 7,641,766, "Method of Using Aldehyde-Functionalized Polymers to Enhance Paper Machine Dewatering."

Addition of aldehyde-functionalized polymers to the papermaking process has been conducted in many different ways to achieve the desired strength effects. Like all wet-end additives, such polymers are commonly fed directly to thin or thick stock of papermachine systems prior to the sheet forming process, but other approaches such as spraying the additive onto a wet sheet prior to the press section has also been practiced.

Sizing emulsions utilize polymers as emulsion stabilizers. Rather than being a variety of aldehyde-functionalized as described herein, these polymeric emulsion stabilizers are typically cationic vinyl addition polymers (See e.g., U.S. Pat. No. 4,657,946) and polymers and copolymers of diallyl-dialkylammonium halide that are substantially free of ammonium groups attached to the polymer or copolymer by only one chemical bond have also been used (e.g., U.S. Pat. No. 6,491,790). Such polymers, however, do not provide the benefits of aldehyde-functionalized polymers as discussed above.

There thus exists an ongoing industrial need in the papermaking industry to develop sizing formulations that improve sizing of paper and paperboard and also provide other enhancements to papermaking process to reduce the need for multiple chemistries.

SUMMARY

This invention accordingly provides novel sizing mixtures to achieve improved sizing along with other benefits as herein described to the papermaking process. In a preferred aspect, the disclosed invention is a composition comprising a sizing mixture having a stabilizing amount of one or more aldehyde-functionalized polymers and a sizing amount of a sizing composition. In various embodiments, the polymers have a weight average molecular weight of at least about 50,000 g/mole and are stably present in an amount from about 2 wt % to about 33 wt %, based on total weight of the composition.

In another aspect, the invention is a method of improving paper and paperboard production and enhancing sizing through adding an effective amount of the disclosed sizing mixture to the paper machine. The composition may be added any location or any point in the papermaking process. In the method, the composition may be added to wet end locations used for conventional wet end additives and/or into white water systems. In the method, the sizing mixture may also be added to a thin stock, a thin stock approach line to a headbox, or a thick stock in the papermaking process.

In another aspect, the invention is a method of producing a medium having cellulosic fibers, wherein the method includes adding the disclosed sizing mixture to the medium at any point in a papermaking process, the medium optionally having mineral filler(s).

It is an advantage of the invention to provide a composition and method of sizing that increases the sizing effect of a sizing emulsion at fixed size dose.

It is another advantage of the invention to provide a composition and method of sizing that reduces the amount of size used to achieve a given sizing response.

It is a further advantage of the invention to provide a composition and method that improves water removal to increase papermachine speed for greater production.

It is yet another advantage of the invention to provide a composition and method that reduces the amount of drying energy (i.e., steam demand) needed at fixed production rate.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims

DETAILED DESCRIPTION

Figure 1:
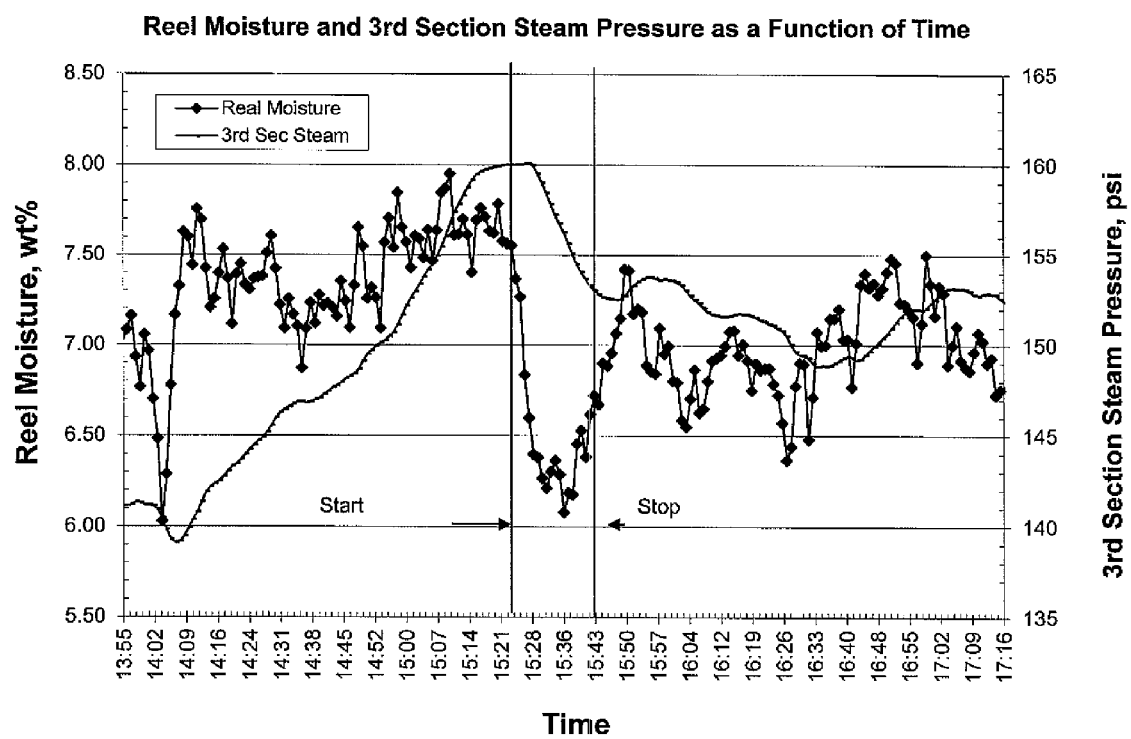
FIG. 1 is a graphical representation of the effect of an embodiment of the invention on reel moisture and steam pressure as a function of time.

It has been discovered unexpectedly that when one or more aldehyde-functionalized polymers is used as the stabilizing agent for sizing mixtures, dramatic increases in papermachine dewatering, and thereby increases in paper production, are achieved. "Sizing mixtures" means, according to embodiments, a sizing emulsion or a sizing dispersion, and "emulsion" and "dispersion" are sometimes used interchangeably herein to refer to a sizing mixture. Whether a particular sizing mixture is an emulsion or a dispersion will be apparent to those skilled in the art. Such increases in paper production have not been found to occur when an equivalent amount of one or more aldehyde-functionalized polymers is added to the paper furnish directly. Additionally, significant increases in internal sizing were achieved using the disclosed aldehyde-functionalized polymers as the stabilizing agent for the sizing emulsion when compared with equal amounts of polymer stabilizers consisting of starch or low to medium molecular weight cationic acrylamide polymers (i.e., sizing emulsion stabilizers currently used in the papermaking industry). The latter polymers are generally copolymers of acrylamide with common cationic monomers (e.g., DADMAC, DMAEA*MCQ, and DMAEM*MCQ—see e.g., U.S. Pat. No. 4,657,946, "Paper Sizing Method and Emulsion") but the use of other cationic polymers has also been practiced and is generally well known.

In embodiments of the present invention, aldehyde-functionalized polymers for inclusion in the composition and method are aldehyde-functionalized polymers prepared by reacting a precursor or preformed polymer comprising one or more aldehyde-reactive moieties with one or more aldehydes. Such polymers may have various architectures including linear, branched, star, block, graft, dendrimer, the like, and any other suitable architecture. Preferred polymers comprise those having amino or amido groups as the aldehyde-reactive moieties. These precursor or preformed polymers may be derived from any suitable source and synthesized using any suitable method. For example, the aldehyde-reactive polymers may be formed via emulsion, dispersion, or solution polymerization and may contain nonionic, cationic, anionic, and zwitterionic monomeric species with the polymer. Moreover, these monomeric species may be present in any amount and in any combination in the polymer.

The following definitions are intended to be clarifying and are not intended to be limiting.

"Acrylamide monomer" means a monomer of formula

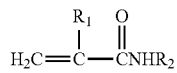

wherein $R_1$ is H or $C_1$-$C_4$ alkyl and $R_2$ is H, $C_1$-$C_4$ alkyl, aryl, or arylalkyl. Preferred acrylamide monomers are acrylamide and methacrylamide. Acrylamide is more preferred.

"Aldehyde" means a compound containing one or more aldehyde (—CHO) groups or a group capable of forming a reactive aldehyde group, where the aldehyde groups are capable of reacting with the aldehyde-reactive, groups (e.g., amino or amido groups) of a polymer as described herein. Representative aldehydes include formaldehyde, paraformaldehyde, glutaraldehyde, glyoxal, the like, and any other suitable mono-functional or poly-functional aldehyde. Glyoxal is preferred.

"Aldehyde-functionalized" means the reaction product of a precursor polymer and an aldehyde, where aldehyde-reactive group(s) of the precursor polymer has reacted with terminal carbonyl group(s) of the aldehyde(s).

"Alkyl" means a monovalent group derived from a straight or branched chain saturated hydrocarbon by the removal of a single hydrogen atom. Representative alkyl groups include methyl, ethyl, n- and iso-propyl, cetyl, and the like.

"Alkylene" means a divalent group derived from a straight or branched chain saturated hydrocarbon by the removal of two hydrogen atoms. Representative alkylene groups include methylene, ethylene, propylene, and the like.

"Amido group" means a group of formula —C(O)NHY$_1$ where Y$_1$ is selected from H, alkyl, aryl, and arylalkyl.

"Amino group" means a group of formula —NHY$_2$ where Y$_2$ is selected from H, alkyl, aryl, and arylalkyl.

"Amphoteric" means a polymer derived from both cationic monomers and anionic monomers, and, possibly, other non-ionic monomer(s). Representative amphoteric polymers include copolymers composed of acrylic acid and DMAEA-MCQ, terpolymers composed of acrylic acid, DADMAC and acrylamide, and the like.

"Aryl" means an aromatic monocyclic or multicyclic ring system of about 6 to about 10 carbon atoms. The aryl is optionally substituted with one or more $C_1$ to $C_{20}$ alkyl, alkoxy, or haloalkyl groups. Representative aryl groups include phenyl or naphthyl, or substituted phenyl or substituted naphthyl.

"Arylalkyl" means an aryl-alkylene-group where aryl and alkylene are defined herein. Representative arylalkyl groups include benzyl, phenylethyl, phenylpropyl, 1-naphthylmethyl, and the like. Benzyl is preferred.

"Diallyl-N,N-disubstituted ammonium halide monomer" means a monomer of the following formula.

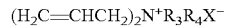

wherein $R_3$ and $R_4$ are independently $C_1$ to $C_{20}$ alkyl, aryl, or arylalkyl and X is an anionic counterion. Representative anionic counterions include halogen, sulfate, nitrate, phosphate, and the like. A preferred anionic counterion is halide. Chloride is preferred. A preferred diallyl-N,N-disubstituted ammonium halide monomer is diallyldimethylammonium chloride.

"Dispersion polymer" polymer means a water-soluble polymer dispersed in an aqueous continuous phase containing one or more organic or inorganic salts and/or one or more aqueous polymers. Representative examples of dispersion polymerization of water-soluble polymers in an aqueous continuous phase can be found in U.S. Pat. Nos. 5,605,970; 5,837,776; 5,985,992; 4,929,655; 5,006,590; 5,597,859; and 5,597,858 and in European Patent Nos. 183,466; 657,478; and 630,909.

"Emulsion polymer" and "latex polymer" mean a polymer emulsion comprising an aldehyde-functionalized polymer according to this invention in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 3,734,873, incorporated herein by reference. Representative preparations of high molecular weight inverse emulsion polymers are described in U.S. Pat. Nos. 2,982,749; 3,284,393; and 3,734,873. See also, Hunkeler, et al., "*Mechanism, Kinetics and Modeling of the Inverse-Microsuspension Homopolymerization of Acrylamide,*" *Polymer*, vol. 30(1), pp 127-42 (1989); and Hunkeler et al., "*Mechanism, Kinetics and Modeling of Inverse-Microsuspension Polymerization:* 2. *Copolymerization of Acrylamide with Quaternary Ammonium Cationic Monomers,*" *Polymer*, vol. 32(14), pp 2626-40 (1991).

"Monomer" means a polymerizable allylic, vinylic, or acrylic compound. The monomer may be anionic, cationic, nonionic, or zwitterionic. Vinyl monomers are preferred, and acrylic monomers are more preferred.

Representative non-ionic, water-soluble monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, vinyl alcohol, and the like.

Representative anionic monomers include acrylic acid, and its salts, including, but not limited to sodium acrylate, and ammonium acrylate, methacrylic acid, and it's salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and it's salts, including, but not limited to the sodium salt, and ammonium salt, sulfonate, itaconate, sulfopropyl acrylate or methacrylate or other water-soluble forms of these or other polymerisable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, itaconic anhydride, and the like.

Representative cationic monomers or mer units include monoallyl amine, diallyl amine, vinyl amine, dialkylaminoalkyl acrylates and methacrylates and their quaternary or acid salts, including, but not limited to, dimethylaminoethyl acrylate methyl chloride quaternary salt (DMAEA•MCQ), dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride (DADMAC). Alkyl groups are generally $C_1$ to $C_4$ alkyl.

Representative zwitterionic monomers are those that are a polymerizable molecule containing cationic and anionic (charged) functionality in equal proportions, so that the molecule is net neutral overall. Specific representative zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulthpropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl) ammonium betaine, and the like.

"Papermaking process" means a method of making paper and paperboard products from pulp comprising forming an aqueous cellulosic papermaking furnish (optionally, with mineral fillers, such as calcium carbonates, clays, etc.), draining the furnish to form a sheet, and drying the sheet. It should be appreciated that any suitable furnish may be used. Representative furnishes include, for example, virgin pulp, recycled pulp, kraft pulp (bleached and unbleached), sulfite pulp, mechanical pulp, polymeric plastic fibers, the like, any combination of the foregoing pulps. The steps of forming the papermaking furnish, draining and drying may be carried out in any manner generally known to those skilled in the art. In addition to the sizing emulsions herein described, other papermaking additives may be utilized as adjuncts with the polymer treatment of this invention, though it must be emphasized that no adjunct is required for effective activity. Such papermaking additives include, for example, retention aids (e.g., micro articles, flocculants, polymeric and inorganic coagulants, etc.), wet and dry strength additives (e.g., cationic starches, polyamidoamine epichlorohydrin-based polymers), the like, and combinations of the foregoing.

In an embodiment, polyamines are prepared by modification of a pre-formed polyamide, for example by hydrolysis of acrylamide-vinylformamide copolymer using acid or base as described in U.S. Pat. Nos. 6,610,209 and 6,426,383.

In an embodiment, polyaminoamides may be prepared by direct amidation of polyalkyl carboxylic acids and transamidation of copolymers containing carboxylic acid and (meth) acrylamide units as described in U.S. Pat. No. 4,919,821.

In another embodiment, the preformed polymers are prepared as an emulsion or latex polymer. For example, the aqueous phase is prepared by mixing together in water one or more water-soluble monomers, and any polymerization additives such as inorganic salts, chelants, pH buffers, and the like. The oil phase is prepared by mixing together an inert hydrocarbon liquid with one or more oil soluble surfactants. The surfactant mixture should have a low hydrophilic-lypophilic balance (HLB), to ensure the formation of an oil continuous emulsion. Appropriate surfactants for water-in-oil emulsion polymerizations, which are commercially available, are compiled in the North American Edition of McCutcheon's Emulsifiers & Detergents. The oil phase may need to be heated to ensure the formation of a homogeneous oil solution. The oil phase is then charged into a reactor equipped with a mixer, a thermocouple, a nitrogen purge tube, and a condenser. The aqueous phase is added to the reactor containing the oil phase with vigorous stirring to form an emulsion.

The resulting emulsion is heated to the desired temperature, purged with nitrogen, and a free-radical initiator is added. The reaction mixture is stirred for several hours under a nitrogen atmosphere at the desired temperature. Upon completion of the reaction, the water-in-oil emulsion polymer is cooled to room temperature, where any desired post-polymerization additives, such as antioxidants, or a high HLB surfactant (as described in U.S. Pat. No. 3,734,873) may be added. The resulting emulsion polymer is a free-flowing liquid. An aqueous solution of the water-in-oil emulsion polymer can be generated by adding a desired amount of the emulsion polymer to water with vigorous mixing in the presence of a high-HLB surfactant (as described in U.S. Pat. No. 3,734,873).

In another embodiment, the preformed polymer used in the invention may be a dispersion polymer. In a typical procedure for preparing a dispersion polymer, an aqueous solution containing one or more inorganic or organic salts, one or more water-soluble monomers, any polymerization additives such as processing aids, chelants, pH buffers and a water-soluble stabilizer polymer is charged to a reactor equipped with a mixer, a thermocouple, a nitrogen purging tube, and a water condenser. The monomer solution is mixed vigorously, heated to the desired temperature, and then a free radical initiator is added. The solution is purged with nitrogen while maintaining temperature and mixing for several hours. After this time, the mixture is cooled to room temperature, and any post-polymerization additives are charged to the reactor. Water continuous dispersions of water-soluble polymers are free flowing liquids with product viscosities generally in the range of about 100 to about 10,000 cP, measured at low shear.

In another embodiment, the preformed or precursor polymers used in the invention are solution polymers. In a typical procedure for preparing solution polymers, an aqueous solution containing one or more water-soluble monomers and any additional polymerization additives such as chelants, pH buffers, and the like, is prepared. This mixture is charged to a reactor equipped with a mixer, a thermocouple, a nitrogen purging tube and a water condenser. The solution is mixed vigorously, heated to the desired temperature, and then one or more free radical polymerization initiators are added. The solution is purged with nitrogen while maintaining temperature and mixing for several hours. Typically, the viscosity of the solution increases during this period. After the polymerization is complete, the reactor contents are cooled to room temperature and then transferred to storage. Solution polymer viscosities vary widely, and are dependent upon the concentration and molecular weight and structure of the active polymer component.

Polymerization reactions are typically initiated by any means which results in generation of a suitable free-radical. Thermally derived radicals, in which the radical species results from thermal, homolytic dissociation of an azo, peroxide, hydroperoxide and perester compound are preferred. Preferred initiators are azo compounds including 2,2'-azobis (2-amidinopropane) dihydrochloride, 2,2'-azobis[2-(2-imidazolin-2-yl)propane]dihydrochloride, 2,2'-azobis(isobutyronitrile) (AIBN), 2,2'-azobis(2,4-dimethylvaleronitrile) (AIVN), the like, and combinations thereof. More preferred initiators include peroxides, such as ammonium persulfate, sodium persulfate, the like, and combinations thereof.

In alternative embodiments, the polymerization processes can be carried out as a batch process or in steps. In a representative batch process, all of the monomers are reacted together, whereas in a step or semi-batch process, a portion of the monomer is withheld from the main reaction and added over time to affect the compositional drift of the copolymer or the formation of the dispersion particles. In a continuous process embodiment, all of the monomer is added over time and affects the compositional drift differently.

The polymerization and/or post polymerization reaction conditions are selected such that the resulting polymer comprising aldehyde-reactive moieties (i.e., the preformed or precursor polymer) has a molecular weight of at least about 1,000 g/mole, preferably about 2,000 to about 10,000,000 g/mole. This polymer is then functionalized by reaction with one or more aldehydes. Suitable aldehydes include any compound containing one or more aldehyde (—CHO) functional groups (i.e., mono-functional or poly-functional aldehydes) and having sufficient reactivity to react with the aldeyhyde-reactive moieties (e.g., amino or amido groups) of the polymer. Representative aldehydes include formaldehyde, paraformaldehyde, glutaraldehyde, glyoxal, the like, and any other suitable reactive aldehyde.

In an embodiment, the aldehyde-functionalized polymer is prepared by reacting the polyamide or polyamine with one or more aldehydes at a pH between 4 to 12. The total concentration of polymer backbone (i.e., preformed or precursor polymer having aldehyde-reactive moieties) plus aldehyde is between about 2 to about 35 weight percent. Generally, an aqueous solution of the polymer backbone is prepared for better reaction rate control and increased product stability. The pH of the aqueous polymer backbone solution is increased to between about 4 to about 12. The reaction temperature is generally about 20° C. to about 80° C. preferably about 20° C. to about 40° C. An aqueous aldehyde solution is added to the aqueous polymer backbone solution with good mixing to prevent gel formation. The rate of viscosity increase is monitored using a Brookfield viscometer to follow the cross-linking reaction. A viscosity increase of 0.5 cps indicates an increase in polymer molecular weight and an increase in polymer precursor cross-linking.

Generally, the desired viscosity increase corresponds to a desired level of activity which generally reaches a maximum or a point of diminishing activity at a specific viscosity. The rate of reaction depends on the temperature, total concentration of polymer and aldehyde, the ratio of aldehyde to amide/amine functional groups, and pH. Higher rates of glyoxylation (in the case where glyoxal is used as the aldehyde) are expected when the temperature, total concentration of polymer and aldehyde, the ratio of aldehyde to amide/amine functional groups or pH is increased. The rate of reaction can be slowed down by decreasing the total concentration of polymer and aldehyde, temperature, the ratio of aldehyde to amide/amine functional groups or pH (to between about 2 to about 3.5). The amount of unreacted aldehyde at the end of the reaction increases as the ratio of aldehyde to amide/amine functional groups is increased.

In a preferred embodiment, the precursor polymer is prepared from a DADMAC and acrylamide copolymer. Monomers of DADMAC and acrylamide may be present in weight-to-weight ratios in the precursor polymer ranging from about 5/95 to about 95/5, respectively. This precursor copolymer preferably has a weight average molecular weight of about 17,000 g/mole and is reacted, for example, with glyoxal. The amount of glyoxal can vary but is usually added to achieve a glyoxal to acrylamide mole ratio of 0.1 to 1.0. A preferred DADMAC/acrylamide weight-to-weight ratio is 10/90.

The reaction conditions are preferably selected such that the molar ratio of aldehyde to aldehyde-reactive moiety is from about 0.05 to about 1.5. This range of molar ratios may result in a wide range of the aldehyde-reactive moieties of the precursor polymer being functionalized. For example, from about 0.5 mole percent to greater than 40 mole percent of the aldehyde-reactive moieties may be functionalized. Moreover, depending on the particular combination of chosen aldehydes, from about 2 to about 40 percent or more of those reacted moieties may participate in cross-links through the multifunctional aldehyde.

In one embodiment, 15 mole percent, preferably at least about 20 mole percent of the amino or amido groups in the polymer react with the aldehyde to form the aldehyde-functionalized polymer. The resulting aldehyde-functionalized polymers have a weight average molecular weight of at least about 100,000 g/mole, preferably at least about 300,000 g/mole.

In an embodiment, the aldehyde-functionalized polymer is formed from one or more precursor polymers having aldehyde-reactive moieties selected from any combination of amines, amides, and hydroxyls.

In another embodiment, the aldehyde-functionalized polymer is a copolymer comprising about 1 to about 99 mole percent acrylamide monomers and about 95 mole percent to about 1 mole percent of one or more cationic, anionic, nonionic, or zwitterionic monomers, or a mixture thereof. Copolymers prepared from nonionic aldehyde-reactive monomers and cationic monomers preferably have a cationic charge of about 1 to about 50 mole percent, more preferably from about 1 to about 30 mole percent. Copolymers prepared from, nonionic aldehyde-reactive monomers and anionic monomers preferably have an anionic charge of about 1 to about 50 mole percent, more preferably from about 1 to about 30 mole percent. Zwitterionic polymers preferably comprise 1 to about 95 mole percent, preferably 1 to about 50 mole percent zwitterionic monomers.

In another embodiment, the aldehyde-functionalized polymers are amphoteric polymers that preferably have an overall positive charge. Preferred amphoteric polymers are composed of up to about 40 mole percent cationic monomers and up to about 20 mole percent anionic monomers with the remaining monomers preferably being aldehyde-reactive monomers. More preferred amphoteric polymers comprise about 5 to about 10 mole percent cationic monomers and about 0.5 to about 4 mole percent anionic monomers with the remaining monomers preferably being aldehyde-reactive monomers.

In an embodiment, the disclosed polymer composition comprises from about 10 to about 90 mole percent aldehyde remains unreacted. In embodiments, the amount of aldehyde that remains unreacted may range (all ranges in mole percent) from about 10 to about 80, or from about 10 to about 70, or from about 10 to about 60. In other embodiments, the amount of aldehyde that remains unreacted is greater than about 60 mole percent.

In embodiments of the present invention, any sizing agent may be used in the sizing emulsion. Representative sizing agents include rosin size and water-insoluble hydrophobic cellulose-sizing agents, such as alkyl ketene dimer ("AKD") or alkenyl succinic anhydride (ASA) and mixtures thereof that are emulsified with the polymers of the invention in aqueous solution. Such sizing agents prepared from various alkyl or alkenyl hydrocarbon chains, for example, are well-known in the art.

In embodiments, AKD and rosin sizing agents are used as dispersions (i.e., solid suspended in a liquid medium) rather than an emulsion. Such dispersions are sometimes used in circumstances where the melting point for certain AKDs and rosin sizing agents are lower than the use temperature. The dispersions, for example, may be made by melting and emulsifying the AKD or rosin sizing agent, allowing it to cool and solidify, and dispersing in a liquid solvent. Thus, in such embodiments, when the sizing agent is a solid at room temperature converting the solid to a liquid is typically necessary to form the emulsion.

Stabilized size emulsions can be generally prepared using the procedures taught in colloid science (e.g. S. E. Friberg & S. Jones, "Emulsions" in the Encyclopedia of Chemical Technology, Vol. 9 (4$^{th}$ edition)). The general concept consists of imparting energy to a mixture of hydrophobic material (size in this case) and water in the presence of stabilizer (in this case the cationic polymers described herein) which results in "small" droplets or particles of the hydrophobic material suspended in the aqueous phase. The mixing can be accomplished in any number of ways with the method of mixing being immaterial to the application as long as the desired results are achieved.

Desired results normally refer to the average particle size and particle size distribution. Mechanical means for emulsification, for example, can include high-speed agitators, mechanical homogenizers, or turbine pumps. The latter is frequently employed to prepare size emulsions. The equipment must be capable of preparing an emulsion particle size in the range generally between about 0.01 and about 10 microns. A preferred particle size is between about 0.5 to 3 microns. The emulsion size here refers to the median diameter of a vol % distribution obtained with a Malvern Mastersizer laser diffraction instrument (available from Malvern Instruments, Ltd., Malvern, UK). The median is defined as the diameter where 50% of the particles are greater than this value and 50% are less than the value. The size of the emulsion can be controlled by the amount of energy and stabilizer added. Normally, the emulsion would be prepared from a mixture of the size, the polymeric stabilizer, and enough water to achieve the desired dilution. As noted in, for example U.S. Pat. Nos. 4,657,946 and 7,455,751, a surfactant of the sorts identified therein can be added to enhance the emulsification.

The ratio of ASA size to cationic polymer stabilizer generally range between 1:1 to 20:1, preferably between about 2:1 to about 15:1 and most preferably this ratio ranges between about 2.5:1 to about 10:1. Ratios are by weight of active ingredients. The size can then be fed to the paper or paperboard as an emulsion containing a solids content in an aqueous phase ranging from about 0.1 to about 10 wt % with this solids content containing the ratios of size to cationic polymer described above. The final size emulsion is normally fed to the wet end of the paper machine, which can include the thin stock, thick stock, or white water systems. Most typically the size is fed in the thin stock approach line to the headbox, which also includes the white water system (e.g., pre-fan pump). Although wet end addition of the size emulsion is the norm, any addition point that can introduce the size to the final paper sheet would be capable of yielding a sized sheet and would be used in implementing the method of the invention in various embodiments. Examples are disclosed in U.S. Pat. Nos. 4,657,946 and 7,455,751.

In another embodiment, a mixing chamber is used to introduce the sizing emulsion into the papermaking process. Examples of such mixing chambers are disclosed in U.S. patent Ser. No. 11/339,169, "Method and Arrangement for Feeding Chemicals into a Process Stream," (available from Nalco Company in Naperville, Ill.) and the Ultra Turax, model no. UTI-25 (available from IKA® Works, Inc. in Wilmington, N.C.). It is envisioned that any suitable reactor or mixing device/chamber may be utilized in the method of the invention.

The foregoing may be better understood by reference to the following examples, which are intended for illustrative purposes and are not intended to limit the scope of the invention.

Example 1

In this example, an embodiment of the invention using 5 mol % DADMAC (Diallyldimethylammonium chloride)/AcAm polymer glyoxalated with a 0.8 mole ratio of glyoxal to AcAm was used as the emulsion stabilizer (Polymer 1) and compared against a 10 mol % DMAEM*MCQ (Dimethylammoniumethylmethyacrylated methylchloride quat)/AcAm (acrylamide) emulsion stabilizer (Polymer 2). The ASA used in the tests was a commercially available formulation derived from a mixture of $C_{16}$ and $C_{18}$ alkenyl chains (available as N7540 from Nalco Company, Naperville, Ill.) at a concentration of 100% (typically ASA is available neat) was used for the following test method.

Tests were conducted on a dual headbox Fourdrinier paperboard machine producing about 600 tons/day of linerboard using 100% recycle fiber derived from old corrugated containers. The test method comprised substituting Polymer 1 in lieu of Polymer 2 as the emulsion stabilizer for an internal sizing application. The ratio of Polymer 1 to Polymer 2 was slowly increased, with a ratio of 1:1 occurring at Reel No. 5 ending with 1:0 at Reel No. 8. At Reel No. 11, the ratio was changed to 0:1 (i.e., a reversion to 100% Polymer 2). The various ratios of polymers were added to the size turbine on the emulsification skid at the wet end of the papermachine, where the consistency varied from 0.35-0.90%. The emulsion was fed just after the pressure screen on the furnish approach to the headbox. Results are shown in Table 1

TABLE 1

| | Reel No. | | | | | | | | | | | | |
|---|---|---|---|---|---|---|---|---|---|---|---|---|---|
| | 3 | 4 | 5 | 6 | 7 | 8 | 9 | 10 | 11 | 12 | 13 | 14 | 15 |
| Top 10 min. Cobb | 115 | 110 | 95 | 92 | 96 | 92 | 83 | 64 | 103 | 111 | 106 | 110 | 103 |
| Bottom 10 min. Cobb | 110 | 106 | 94 | 84 | 88 | 83 | 73 | 54 | 93 | 105 | 95 | 100 | 97 |

Observed from the results in Table 1, was a significant unexpected improvement in sizing at 100% Polymer 1 (Reel No. 10). In addition, the wet line appeared to go towards the couch even when sheet at the reel became drier, and the fiber orientation by Tensile Stiffness Orientation ("TSO") was effected enough to cause a need for adjustments to the papermachine (e.g., rush to drag, indicating significant increase in drainage rate). Partial Polymer 1 substitution (Reel No. 5) did not result in any of the observable effects.

Example 2

Tests were conducted on a dual headbox Fourdrinier paperboard machine producing about 600 tons/day of linerboard using 100% recycle fiber derived from old corrugated containers. In this example, Polymer 1 and Polymer 2 were used and compared as the emulsion stabilizer as in example 1. FIG. 1 graphically illustrates Reel Moisture and Steam Pressure as a function of time.

Several unexpected observations were made from the data shown in FIG. 1. The sheet moisture at the reel dropped dramatically from 7.6 to 6.1 wt % in a matter of a few minutes after switching from Polymer 1 to Polymer 2. Sheet moisture drop was then recovered automatically through steam reductions from 160 to 153 psi. Top ply vacuum seal pit level increases were also observed, indicating more effective vacuum dewatering, and excess bottom ply white overflow increases were observed within a few minutes, indicating increased forming section dewatering. When the test was returned to the Polymer 1 emulsion, a nearly immediate reversion of these benefits was observed. Moreover, CSF (i.e., pulp freeness) tests did not reveal any noticeable increase in drainage rate when the sizing emulsion having Polymer 2 was added, indicating this conventional measurement of drainage did not change.

Example 3

Tests were conducted on a dual headbox Fourdrinier paperboard machine producing about 600 tons/day of linerboard using 100% recycle fiber derived from old corrugated containers. It was observed that use of a 5 mol % DADMAC/AcAm backbone used to prepare Polymer 2 for ASA emulsification resulted in a loss in sizing, indicating that simple cationic copolymers without aldehyde-functionalization hurt performance and demonstrating the need for such functionalization in this application.

Example 4

Tests were conducted on a dual headbox Fourdrinier paperboard machine producing about 600 tons/day of linerboard using 100% recycle fiber derived from old corrugated containers. It was observed that addition of Polymer 2 (by itself without being emulsified with the ASA sizing additive) to the wet end of the papermachine (e.g., thin stock) actually yields less sizing (as measured by increased Cobb value) demonstrating that the polymer of the invention must be added as part of the ASA sizing additive to achieve the demonstrated beneficial sizing results.

Example 5

Figure 2:
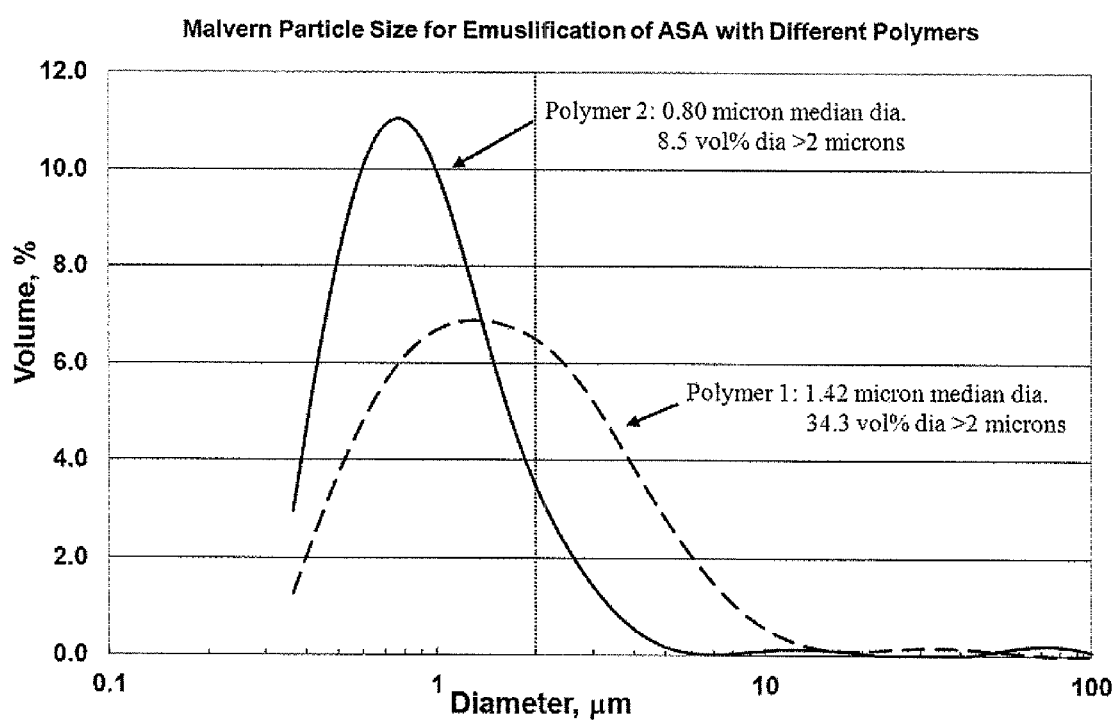
FIG. 2 shows Malvern Mastersizer distributions (vol % of emulsion particles with a given diameter) for ASA emulsions prepared with an existing polymeric emulsifier containing a surfactant and with the polymers of the invention.

It is known that emulsions prepared with smaller particle size and narrower distributions will yield improved sizing (e.g., U.S. Pat. No. 4,657,946; J. C. Roberts, "Neutral and Alkaline Sizing" in Paper Chemistry, J. C. Roberts, Ed., Chapman and Hall: New York, 1991). FIG. 2 shows Malvern Mastersizer distributions (vol % of emulsion particles with a given diameter) for ASA emulsions prepared with an existing polymeric emulsifier containing about 1 wt % of surfactant (e.g., ethoxylated alkyl phosphate ester) and with the aldehyde-functionalized polymers of the invention. As indicated in the FIG. 2, the median diameter of the emulsion prepared with glyoxalated DADMAC/AcAm (10/90 wt ratio) with 0.8 glyoxal to AcAm ratio (Polymer 1) is 78% larger than with the best standard emulsifier (consisting of 19.8 wt % DMAEM*MCQ (dimethylaminoethylmethacrylate methylchloride quat)/AcAm (acrylamide) (10/90 mole ratio)+1 wt % surfactant ethoxylated tridecyl alcohol phosphate ester (Polymer 2) Additionally, the emulsion size greater than 2 microns diameter is dramatically larger for the emulsion prepared with the glyoxalated polymer. The size distribution of the glyoxalated polymer prepared emulsion is also seen to be much broader. FIG. 2 also shows that the glyoxalated polymer produced poorer emulsion as judged by particle size properties.

Figure 3:
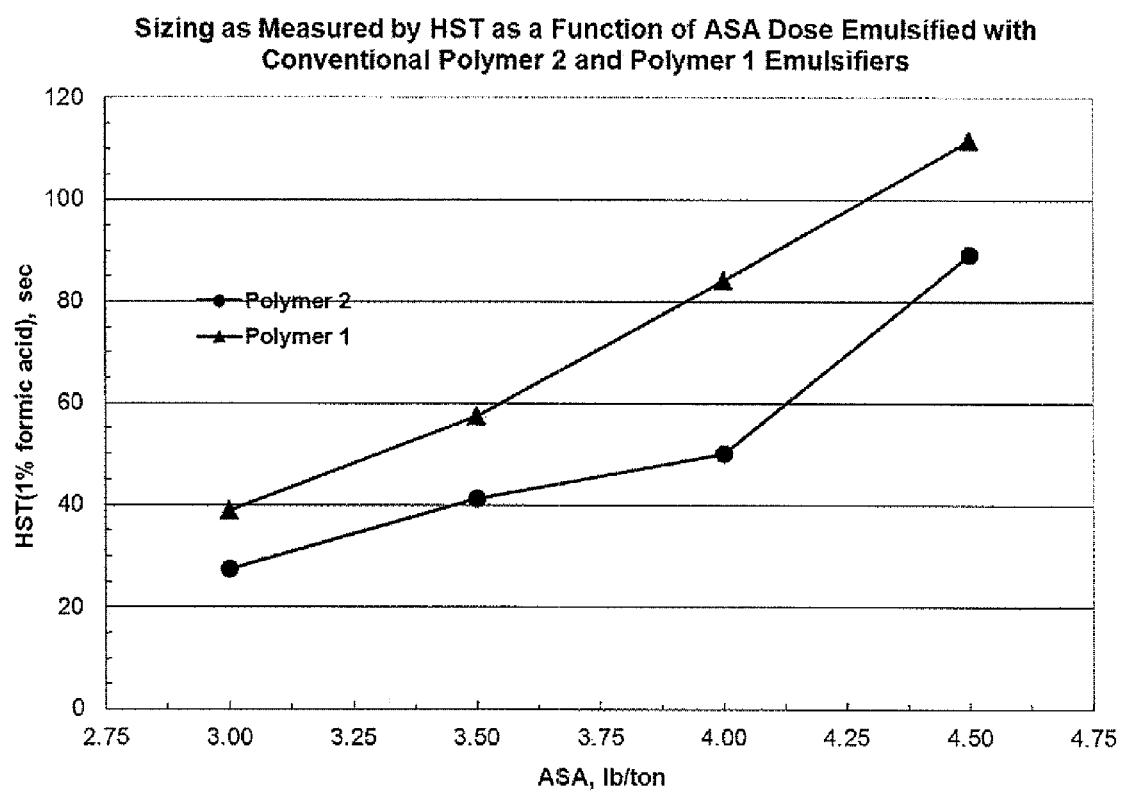
FIG. 3 shows that the sizing effect on laboratory prepared handsheets as measured by Hercules Sizing Test ("HST") method was unexpectedly better with glyoxalated polymer emulsion.

Even though the particle size distribution of the ASA emulsion prepared with glyoxalated polymer was poorer than the emulsion prepared with standard emulsifier, FIG. 3 shows that the sizing effect on laboratory prepared handsheets as measured by HST method was unexpectedly better with the glyoxalated polymer emulsion, in contradiction to the accepted belief by those skilled in the art that a better emulsion yields better sizing. The furnish used in the testing of FIG. 3 was recycled board furnish. The HST test evaluates the sizing (water penetration in the sheet) by optically measuring the time for a dye solution to penetrate the sheet. In the HST tests conducted the dye solution also contained 1 wt % formic acid. FIG. 3 shows the improved sizing obtained with the ASA emulsions prepared with the particle size distribution of the ASA emulsion prepared with glyoxalated polymer even though the emulsion size distribution is poorer than the comparative emulsion.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of improving paper and paperboard production and enhancing sizing, the method comprising adding an effective amount of a composition to the paper machine, the composition comprising a sizing mixture having a stabilizing amount of one or more aldehyde-functionalized polymers and a sizing amount of a sizing composition;
    wherein the sizing mixture is a sizing emulsion;
    wherein the one or more aldehyde-functionalized polymers have a weight average molecular weight of at least about 50,000 g/mole.

2. The method of claim 1, wherein the one or more aldehyde-functionalized polymers is stably present in an amount from about 2 wt % to about 33 wt %, based on total weight of the composition.

3. The method of claim 1, wherein the one or more aldehyde-functionalized polymers is formed from one or more precursor polymers having aldehyde-reactive moieties selected from the group consisting of: amines, amides, hydroxyls, and any combination of the foregoing.

4. The method of claim 1, wherein the one or more aldehyde-functionalized polymers contains at least one aldehyde-reactive monomer species present in any amount and in any combination in said aldehyde-functionalized polymer, said monomer species selected from the group consisting of: non-ionic monomers; cationic monomers; anionic monomers; zwitterionic monomers; and any combination of the foregoing.

5. The method of claim 1, wherein the one or more aldehyde-functionalized polymers comprise a copolymer formed from diallydimethylammonium chloride monomers and acrylamide monomers in a weight-to-weight ratio of about 10/90, respectively.

6. The method of claim 1, wherein the one or more aldehyde-functionalized polymers is formed by reacting one or more precursor polymers having aldehyde-reactive moieties with one or more types of mono-functional and/or poly-functional aldehydes in a molar ratio of about 0.05 to about 1.5, respectively.

7. The method of claim 1, wherein the one or more aldehyde-functionalized polymers are formed from by reacting a preformed polymer having one or more aldehyde-reactive moieties with one or more aldehydes selected from the group consisting of: formaldehyde, paraformaldehyde, glyoxal, glutaraldehyde, and combinations thereof.

8. The method of claim 1, wherein at least about 1 mole percent of the aldehyde-functionalized moieties in said aldehyde-functionalized polymer participate in cross-links through a multifunctional aldehyde.

9. The method of claim 1, wherein the aldehyde-ffunctionalized polymers have a weight average molecular weight of at least about 300,000 g/mole.

10. The method of claim 1, wherein the sizing composition comprises rosin sizes, alkylene ketene dimmers, alkenyl succinic anhydrides, and combinations thereof.

11. The method of claim 1, further comprising a solids content ranging from about 0.1 to about 10 wt % in an aqueous phase.

12. The method of claim 1, further comprising adding said composition to (i) wet end locations used for conventional wet end additives and/or (ii) into white water systems.

13. The method of claim 1, further comprising adding said composition to a thin stock in the papermaking process.

14. The method of claim 1, further comprising adding said composition to a thin stock approach line to a headbox in the papermaking process.

15. The method of claim 1, further comprising adding said composition to a thick stock in the papermaking process.

16. The method of claim 1, further comprising adding said composition to any point in the papermaking process that is capable of introducing a sizing emulsion to the paper sheet.

17. The method of claim 1, further comprising adding said composition to the paper machine using a mixing chamber.

18. The method of claim 1, wherein the sizing composition comprises alkenyl succinic anhydrides.

19. The method of claim 18, wherein the ratio of the alkenyl succinic anhydrides to the one or more aldehyde-functionalized polymers ranges between 1:1 to 20:1, wherein ratios are by weight.

20. The method of claim 1, wherein the sizing emulsion has a particle size between about 0.01 and about 10 microns.

21. The method of claim 1, wherein the sizing emulsion has a particle size between about 0.5 to 3 microns.

* * * * *